(12) United States Patent
Chetuparambil et al.

(10) Patent No.: US 7,089,299 B2
(45) Date of Patent: Aug. 8, 2006

(54) DISTRIBUTED APPLICATION DEPLOYMENT USING PROGRAM CHARACTERISTICS AND ENVIRONMENT CHARACTERISTICS

(75) Inventors: Madhu Chetuparambil, Pittsburgh, PA (US); James R. Giles, Yorktown Heights, NY (US); Shankar Ramaswamy, Pittsburgh, PA (US); Marcia L. Stockton, Bakersfield, CA (US); Dinesh Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 10/047,831

(22) Filed: Jan. 15, 2002

(65) Prior Publication Data

US 2003/0135591 A1    Jul. 17, 2003

(51) Int. Cl.
*G06F 15/16*     (2006.01)

(52) U.S. Cl. .......................... 709/220; 709/213; 707/2; 707/5

(58) Field of Classification Search ............... 718/105; 709/220
See application file for complete search history.

(56) References Cited

U.S. PATENT DOCUMENTS

| | | | | |
|---|---|---|---|---|
| 5,905,666 A | * | 5/1999 | Hoffman et al. | 700/99 |
| 6,098,064 A | * | 8/2000 | Pirolli et al. | 707/2 |
| 6,415,368 B1 | * | 7/2002 | Glance et al. | 711/158 |
| 2003/0115281 A1 | * | 6/2003 | McHenry et al. | |

* cited by examiner

*Primary Examiner*—Zarni Maung
*Assistant Examiner*—Glenford Madamba
(74) *Attorney, Agent, or Firm*—Marcia L. Doubet; Jerry W. Herndon; Jeanine Ray Yarletts

(57) ABSTRACT

Methods, systems, and computer program products for programmatically determining whether components of a program are suitable for deployment in particular locations such as at the edge of a network. In preferred embodiments, program characteristics and operating environment characteristics, along with information about their interactions, are programmatically combined at deployment time to determine whether application components are edgeable. The disclosed approach enables people such as programmers (who are familiar with the program characteristics) and systems administrators (who are familiar with the operating environment characteristics) to each provide some control over the edgeability determination, along with other systems experts (who know how these features interact). Alternatively, this information or portions thereof may be supplied programmatically. Preferably, techniques of matrix algebra are used for the programmatic combination, yielding a value which is compared to a predetermined edgeability threshold to determine a particular component's edgeability.

11 Claims, 7 Drawing Sheets

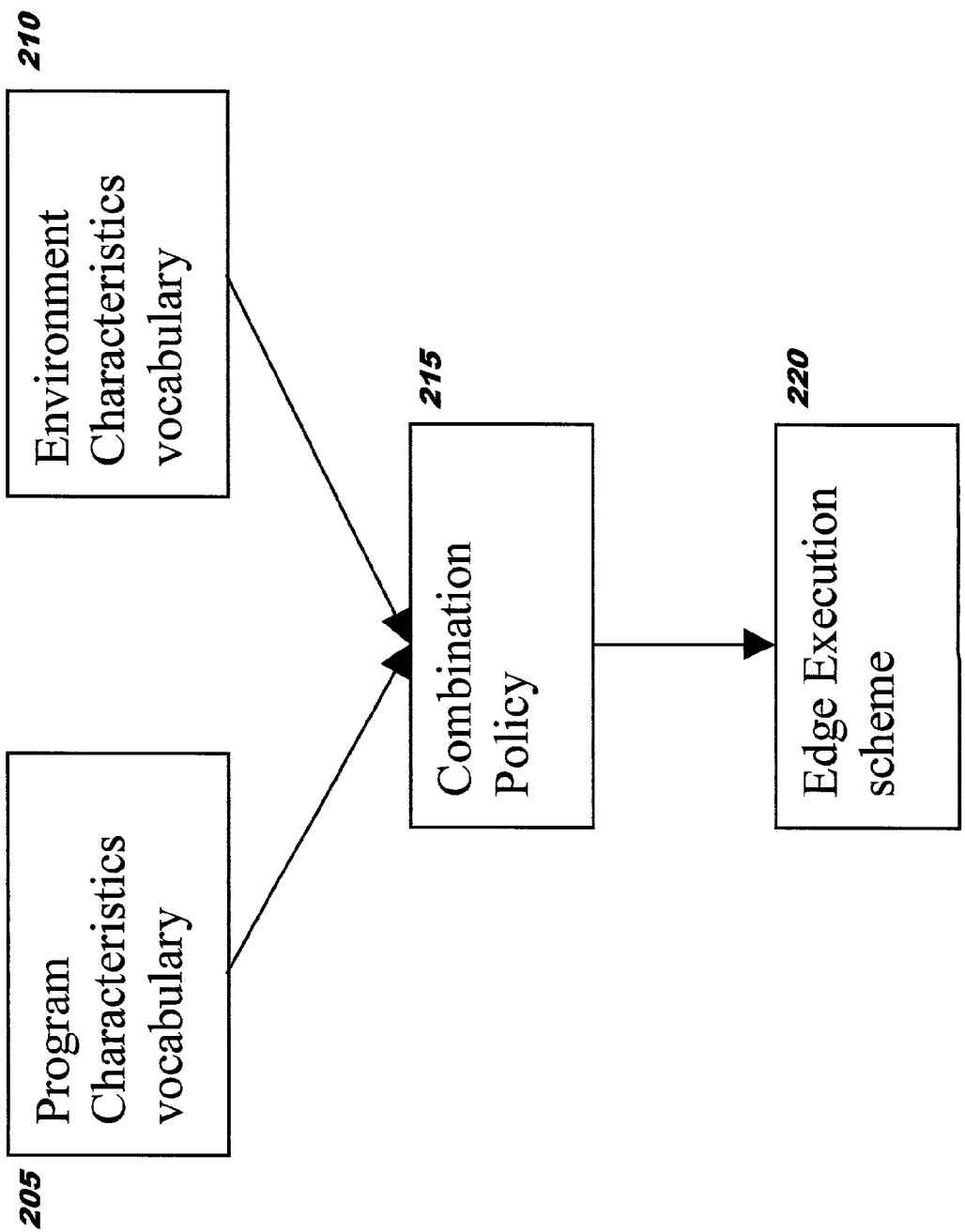

FIG. 3A

| | | |
|---|---|---|
| 301 | Frequent database modifications using JDBC | 0 |
| 303 | Frequent directory modifications using JNDI | 0 |
| 305 | Read only access to database with JDBC | 0 |
| 307 | Read only access to directory with JNDI | 1 |
| 309 | No data access | 0 |
| 311 | Local write only | 0 |
| 313 | EJB use | 0 |
| 315 | Code distribution restricted due to trade secret algorithm | 0 |
| 317 | Accesses sensitive data (e.g. private keys) so needs secure environment | 0 |
| 319 | Code distribution restricted due to legal restrictions | 0 |

| | |
|---|---|
| EJB support at edge | 0 |
| Average relative link speed between edges and backend | 0.8 |
| Edge Server meets security requirements | 0.2 |
| Edges licensed for all legally restricted code | 0 |

401 — EJB support at edge
403 — Average relative link speed between edges and backend
405 — Edge Server meets security requirements
407 — Edges licensed for all legally restricted code
402, 404 — column headers

FIG. 4A $$V_E = \begin{pmatrix} 0 \\ .8 \\ .2 \\ 0 \end{pmatrix}$$

$$M_{PE} = \begin{array}{r|cccc|} & \text{EJB} & \text{Jspd} & \text{Spec} & \text{Lic} \\ \hline \text{JDBC} & 0 & 1 & 0 & 0 \\ \text{JNDI} & 0 & 1 & 0 & 0 \\ \text{JDBC R/O} & 0 & .9 & 0 & 0 \\ \text{JNDI R/O} & 0 & 1 & 0 & 0 \\ \text{No Data} & 0 & 1 & 0 & 0 \\ \text{Local Write} & 0 & 1 & 0 & 0 \\ \text{EJB usage} & 1 & .5 & .8 & 0 \\ \text{Trade Secret} & 0 & 0 & 1 & 0 \\ \text{Security} & 0 & 0 & 1 & 0 \\ \text{Legal} & 0 & 0 & .2 & 1 \\ \end{array}$$

FIG. 6

$$\text{Edgification weight} = V_P \cdot M_{PE} \cdot V_E =$$

$$(0\ 0\ 0\ 1\ 0\ 0\ 0\ 0\ 0\ 0) \begin{pmatrix} 0 & 1 & 0 & 0 \\ 0 & 1 & 0 & 0 \\ 0 & .9 & 0 & 0 \\ 0 & .9 & 0 & 0 \\ 0 & 1 & 0 & 0 \\ 0 & 1 & 0 & 0 \\ 1 & .5 & .8 & 0 \\ 0 & 0 & 1 & 0 \\ 0 & 0 & 1 & 0 \\ 0 & 0 & .2 & 1 \end{pmatrix} \begin{pmatrix} 0 \\ .8 \\ .2 \\ 0 \end{pmatrix} = .72$$

FIG. 7A

|   |   |   |   |   |   |   |   |   |   |
|---|---|---|---|---|---|---|---|---|---|
| 0 | 0 | 1 | 0 |   |   |   |   |   |   |
| 0 | 0 | 1 | 0 |   |   |   |   |   |   |
| 0 | 0 | 1 | 0 |   |   |   |   |   |   |
| 0 | 0 | 1 | 0 |   |   |   |   |   |   |
| 0 | 0 | 0 | 0 |   |   |   |   |   |   |
| 0 | 0 | 0 | 1 |   |   |   |   |   |   |
| 0 | 0 | 0 | 0 |   |   |   |   |   |   |
| 0 | 0 | 0 | 0 |   |   |   |   |   |   |
| 0 | 0 | 0 | 0 |   |   |   |   |   |   |
| 0 | 0 | 0 | 0 |   |   |   |   |   |   |

↑ ↑ ↑
trade secret security matrix for EdgeServer as surrogate
Edgification weight: 0.8

FIG. 7B

|   |   |   |   |
|---|---|---|---|
| 0 | 0 | 1 | 0 |
| 0 | 0 | 1 | 0 |
| 0 | 0 | .9 | 0 |
| 0 | 0 | .9 | 0 |
| 0 | 0 | 1 | 0 |
| 0 | 0 | 1 | 0 |
| 1 | .8 | .5 | 0 |
| 0 | 0 | 0 | 0 |
| 0 | 1 | 0 | 0 |
| 0 | .2 | 0 | 1 | matrix for EdgeServer when
geographically distributed

DISTRIBUTED APPLICATION DEPLOYMENT USING PROGRAM CHARACTERISTICS AND ENVIRONMENT CHARACTERISTICS

BACKGROUND OF THE INVENTION

1. Field of the Invention

The present invention relates to computer networks, and deals more particularly with techniques for dynamically deploying application components to various sites within a network based upon characteristics of the components and of the operating environment into which they are to be potentially deployed.

2. Description of the Related Art

Whereas the early Internet served primarily as a distributed file system in which human users could request delivery of already-generated static documents, the trend in recent years has been to add more and more dynamic and personalized aspects into the content that is served to requesters. Typically, this dynamic and personalized content has been generated in the enterprise network. This approach, however, places a heavy demand on the enterprise computing resources. Several techniques have been developed for alleviating the processing burden on back-end servers, including caching of static content (and to a limited extent, caching of content after it has been dynamically generated); workload balancing; and content distribution.

Caching attempts to avoid repeated generation of content by storing content and serving it to subsequent requesters whenever possible. Serving cached content not only reduces the workload ante back-end computing resources, but it also improves response time to the user. Workload balancing improves the performance of a Web site by dynamically adjusting the amount of work sent to each server in a clustered group of servers. Content distribution attempts to pro-actively (statically) publish static content to various locations in the network, for example to cache servers in order to increase the likelihood that requests can be served from cache. Content Distribution Service Providers ("CDSPs") offer a valuable service by providing access to their broad network infrastructure for caching of static content in close proximity to the end user. This, in turn, enables enterprises to scale their operations in a cost-effective manner. Dynamic content distribution (i.e. dynamically moving generated content closer to users) would yield the same scalability benefits. For some applications (e.g. those which provide session management within their presentation logic, and which only access the back-end business logic in batch mode), it may be possible to (statically) deploy the presentation logic at the edge of the network. In these cases, the content distribution process will typically result in reduced response time as well.

Use of "edge servers" in a network configuration provides increased network efficiency and availability by caching static application components (such as images, forms, etc.) near the edge of the network, where they can be quickly returned to a requester (or quickly retrieved by presentation logic for use in assembling a response to be delivered to a requester). An edge server is a server which is physically located at or near the edge of a network. Edge servers may perform workload balancing, and are sometimes referred to as distributed web caches or surrogates (equivalently, "reverse proxies") or intermediaries (equivalently, "interception proxies" or "forward proxies"). The IBM WebSphere® Edge Server, for example, performs workload balancing and also functions as a reverse proxy and/or cache server. FIG. 1 provides a diagram of a representative server site 100 (i.e. a collection of server nodes that serve web content associated with a given fully-qualified domain name) within a network, which may (for purposes of example) serve content for a domain name such as "www.ibm.com". This example server site 100 comprises a cluster 150 of application servers 140 (such as IBM WebSphere application servers); several back-end enterprise data servers 160 (such as IBM OS/390® servers running the DB/2 and/or CICS® products from IBM); several Web servers 130 (such as Apache, Netscape, or Microsoft servers; note that the application server and Web server are often co-resident in a single hardware box); several firewalls 110; and several edge servers or surrogates/caches/load balancers 120. ("WebSphere", "OS/390", and "CICS" are registered trademarks of IBM.)

Offloading portions of applications to edge servers is desirable because it offers great potential for improving performance and scalability. The term "application component" or "component" is used hereinafter to refer to the portions of an application which may potentially be offloaded in this manner, and the offloading process is referred to as "edgifying" an application and/or its components. The decision as to whether a component can be offloaded is referred to hereinafter as the "edgeability" or "edgeable" determination.

Existing application offload techniques which are known to the present inventors for determining the edgeability of an application component use a two-stage approach. In the first stage, a programmer familiar with the application component describes that component using a single check-off approach that specifies whether the component is edgeable or non-edgeable. This description is then used by a deployer, in the second stage, as input to the final deployment (i.e. edgeability) decision. The deployer may either accept the programmer's edgeability input, or may override the programmer's input, depending (for example) on what the deployer knows about the configuration of the target operating environment. The components are then distributed accordingly.

This prior art approach suffers from several drawbacks. As one example, it does not allow for a good combination of the programmer's knowledge about the application components and the deployer's knowledge about the target operating environment. In addition, this prior art approach may in many cases require changes to the existing programming model for Web-based applications to achieve component distribution. As a result, a distributed application may deviate from commonly accepted programming models such as the "J2EE™" model. That is, an application may have to be rewritten to use special interfaces which are implemented one way for those application components which can be distributed, and a different way for those application components which cannot be distributed. This requires using a new programming library, and decisions about offloading components has to be made in a static, inflexible manner by the programmer as he or she chooses which interface to use. Furthermore, this prior art approach does not allow for the programmer to indicate how potential variations in the target operating environment might alter the input on edgeability, or to account for such changes, and it is not easily modifiable. ("J2EE" is an acronym for "Java™ Platform, Enterprise Edition". "Java" and "J2EE" are trademarks of Sun Microsystems, Inc.)

Accordingly, what is needed are techniques for edgifying applications which avoid the shortcomings of prior art techniques.

SUMMARY OF THE INVENTION

An object of the present invention is to provide improved techniques for edgifying applications in a distributed computing environment.

Another object of the present invention is to provide techniques for distributed application deployment by programmatically combining program characteristics and environment characteristics in a systematic manner.

Yet another object of the present invention is to provide techniques for distributed application deployment which dynamically combine, at deployment time, relevant program characteristics and environment characteristics to make an automated edgeability decision.

Still another object of the present invention is to provide techniques which programmatically combine program characteristics and environment characteristics, along with information about their interactions, to determine whether components of a program are suitable for deployment at the edge of a network.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, one aspect of the present invention provides methods, systems, and computer program products for edgifying applications in a computing network. In preferred embodiments, this technique comprises: retrieving values for one or more characteristics of one or more components to be potentially edgified; retrieving values for one or more characteristics of an operating environment in which the edgification is to potentially occur; retrieving a policy which expresses associations between the characteristics of the components and the characteristics of the operating environment; and programmatically combining the values of the characteristics of a particular one of the components, the policy, and the values of the characteristics of the operating environment to yield a result which determines whether the particular component is edgeable. Preferably, the result is compared to a threshold to determine whether the particular component is edgeable.

The present invention may also be used advantageously in methods of doing business, for example by offering dynamic deployment services that will result in more efficient web hosting sites (which may in turn offer their customers the advantage of reduced end-to-end costs and/or improved efficiency for the customer site).

The present invention will now be described with reference to the following drawings, in which like reference numbers denote the same element throughout.

BRIEF DESCRIPTION OF THE DRAWINGS

FIG. 2 provides a diagram illustrating, at an abstract level, how an edgeability decision is made, according to the present invention;

FIG. 3 (comprising FIGS. 3A and 3B) illustrates use of several example program characteristics, and FIG. 4 (comprising FIGS. 4A and 4B) illustrates of several operating environment characteristics, for determining edgeability of program components, according to preferred embodiments of the present invention;

FIGS. 5, 7A, and 7B show sample configuration policy matrices that may be used in preferred embodiments to determine edgeability of program components; and FIG. 6 shows how a representative edgification determination is made, using the sample values from FIGS. 3, 4, and 5.

DESCRIPTION OF PREFERRED EMBODIMENTS

Figure 1:
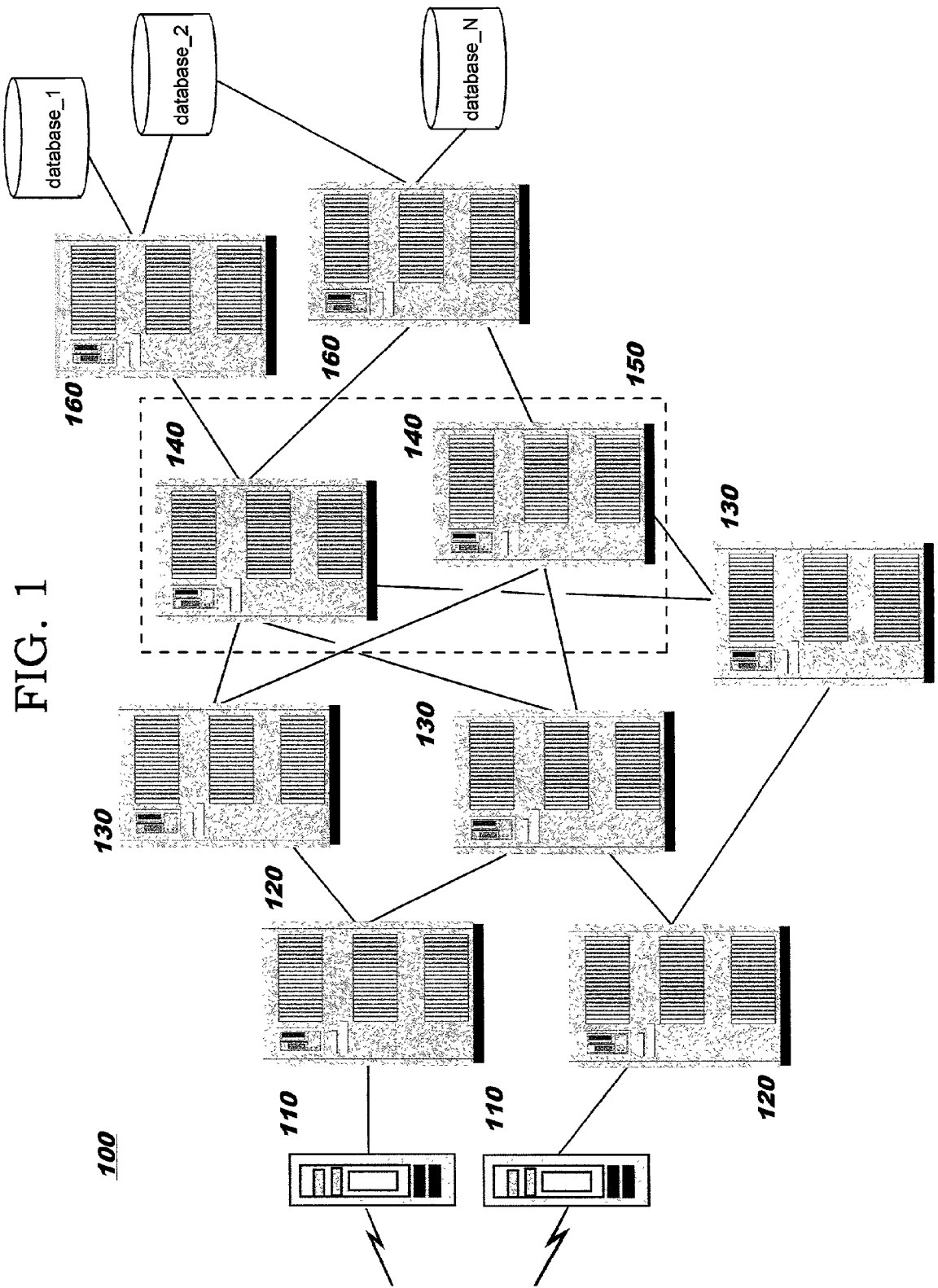
FIG. 1 is a diagram of a server site in which edge servers have been deployed to handle incoming content requests, according to the prior art, and in which the present invention may be practiced.

The present invention defines techniques for programmatically determining whether to deploy application components at the edge of a network. The disclosed techniques give the programmer some control over edgeability decisions, using information which (in preferred embodiments) is provided by the programmer at development time, and also give the deployer some control over these decisions, using information which (in preferred embodiments) is provided by the deployer at or prior to deployment time. In addition, input from a person who is skilled in topics such as infrastructure/middleware concerns (referred to hereinafter as a systems expert, and who is preferably very knowledgeable regarding dependencies between applications and the environments in which they execute) is also provided at or prior to deployment time. Information from these experts is combined in a systematic way to yield an edgeability decision. (Note that while preferred embodiments of the present invention are described herein as pertaining to operations at the edge of a network, these techniques may also be adapted for use at the front-end of a server farm, as will be obvious to one of skill in the art.)

In the general case, the present inventors observe that the edgeability of an application component depends on two sets of parameters, which are (1) the characteristics of the component and (2) the characteristics of the target deployment-time operating environment. Normally, the programmer is only aware of the first set (and not of the second set). The deployer, on the other hand, is aware of the second set of characteristics, but not necessarily of the first set. Using the two-stage, single-check approach of the prior art, the programmer provides input on the program characteristics in the first set of characteristics for the first stage of the deployment decision, and the deployer may accept or reject the programmer's input during the second stage, based upon the deployer's knowledge of the second set of characteristics. As a result, neither of the two people are able to independently determine the complete and correct set of edgeability characteristics when using this prior art approach. The programmer cannot envision, for instance, all current and future operating environments, and the deployer might not know how all the application components work. Thus, when the deployer makes the final edgeability decision, he or she may in some cases make less than optimal decisions using the prior art approach. Furthermore, when something in the application or the environment changes (such as improvements to the edge servers, changes in the network infrastructure, and so forth), it is very expensive to coordinate knowledge of all of the component characteristics and operating environment characteristics to determine a new offload strategy (especially when some components may have been developed by third parties).

According to the present invention, a well-understood vocabulary of terms is used for developers (i.e. programmers) to indicate program characteristics that are pertinent to determining whether or not to execute a program component at the network edge, and for systems administrators to indicate operating environment characteristics that are pertinent to determining what types of components can execute at the edge (and/or will benefit from execution at the edge). According to preferred embodiments, a programmer provides numeric values (preferably at development time) for application components, where these values describe how a particular component behaves by indicating the applicability or importance of each of the specified program characteristics. Similarly, an application deployer (who may alternatively be referred to as a systems administrator) preferably provides values at (or before) deployment time for multiple operating environment characteristics, where the values describe how the environment is set up and indicate the applicability or importance of each of the specified operating environment characteristics.

Instead of simply using a single-valued "check-off" approach as to whether a component is edgeable or not, as in the prior art, the programmer and administrator using the teachings of the present invention describe multiple attributes (i.e. characteristics) of each application component and of the operating environment. By using a vocabulary of terms whose meaning is generally well-understood (i.e. as between programmers and persons such as deployers and systems experts) for these descriptions, relevant factors that influence the deployment decision can be communicated more efficiently and effectively between the parties, and a better decision regarding offloading of components to the edge of the network can be made.

In preferred embodiments, the programmer's input as to the program characteristics and the administrator's input as to the operating environment characteristics are programmatically coupled with information which is referred to herein as "combination policy information" or simply "policy information", and which specifies policies that are applicable in the target deployment environment and/or properties of the deployment environment. The combination policy information is preferably specified by a systems expert at (or before) deployment time, and describes how each program characteristic depends on each operating environment characteristic. (As will be obvious, the input information that is described herein as being specified by programmers, deployers, and systems experts may alternatively be specified by people having other roles. Furthermore, although having different people provide the different types of input reduces the burden on each person and should improve the quality of the provided input, it is not strictly necessary that different people provide this input. In addition, it is not strictly necessary that the various types of input are provided by humans; alternatively, programmatic tools or other automated means may be used for deriving and/or providing this information, or for assisting the humans who provide it.)

In preferred embodiments, the characteristic values range between zero and one, with a zero value indicating that the program characteristic is not applicable or not important for this component (in the case of program components) or that the environment characteristic is not applicable or not supported in this environment (in the case of operating environment characteristics). Similarly, the values in the combination policy are preferably specified as ranging between zero and one, with a zero value indicating an absence of dependency between factors and a value of one indicating a high degree of dependency. (Note that while the descriptions herein are in terms of using numeric values between 0 and 1, this is for purposes of illustration and not of limitation. Use of other numeric values, and of non-numeric values, is within the scope of the present invention.)

An example of a program characteristic is whether (or to what degree) an application component is transactional in nature. Thus, a program characteristic might be expressed as "transactional". Another example is whether (or to what degree) the component is read-only. For those components which are read-only, a value of one is provided in preferred embodiments, whereas for those components which perform write operations, a value of zero or a fractional value, as deemed appropriate for a particular situation, may be provided. (It may be desirable to adjust the actual characteristic values and/or policy values used in a particular implementation of the present invention until obtaining a set of values that influences the edgeability decision in the manner desired.)

An example of an operating environment characteristic is whether (or to what degree) the environment provides transactional support. Thus, an operating environment characteristic might be expressed as "provides transactional support". Another example is whether (or to what degree) the environment provides for security. For those environments which do provide good security, a value of one (or perhaps a fractional value near one) is provided in preferred embodiments, whereas for those environments which provide some security, a value of 0.5 (or perhaps some other fractional value between zero and one) may be appropriate.

As an example of using the combination policy to describe associations between program characteristics and operating environment characteristics, a program characteristic of "transactional" is highly dependent on an operating environment characteristic of "provides transactional support", and therefore a value of one would typically be specified for this combination. The "transactional" program characteristic, on the other hand, depends very little on an operating environment characteristic of "EJBs supported", and thus a value close to zero would typically be specified for this combination. The characteristic values and combination values may also be considered as "weights" with respect to the manner in which they influence the edgeability outcome. ("EJB" is a trademark of Sun Microsystems, Inc.)

In preferred embodiments, the characteristics and combination policy values are stored in vectors and matrices, respectively, and are programmatically combined using techniques of matrix algebra. (For more information on matrix algebra, including a discussion of how vectors and matrices are algebraically combined to yield a numeric result, refer to "Advanced Engineering Mathematics", Erwin Kreyszig, John Wiley and Sons (1992).) The programmer's program characteristics input is preferably represented as a row vector which is referred to herein as "V(P)" or "$V_P$", where this vector has one entry for each of "P" program characteristics for a particular application component. The administrator's operating environment characteristics input is preferably represented as a column vector which is referred to herein as "V(E)" or "$V_E$", where this vector has one entry for each of "E" operating environment characteristics. Thus, each application component will have a vector V(P) of weights associated with it, and each operating environment will have a vector V(E) of weights associated with it. The combination policy information is preferably represented as a matrix of dimension P×E (that is, a matrix having P rows and E columns), and is referred to herein as "M(PE)" or "$M_{PE}$". In this matrix, an entry at row "i" and column "j" expresses the dependency weight for program characteristic "i" and operating environment characteristic "j".

Using the row and column vectors and the matrix, an edgification weight "EW" is computed as the product thereof using matrix multiplication. This computation corresponds to the mathematical expression $$EW = V_P * M_{PE} * V_E$$

and yields a result "EW" (which may or may not be between zero and one). The "EW" value is computed for each application component for which edgification is contemplated; this computed value is compared to a threshold "T" (which also may or may not be between zero and one), to determine whether the program component is edgeable. If EW is greater than the threshold, then the component is edgeable; otherwise, it is not. (The value selected for the threshold in a particular implementation of the present invention is implementation-specific.)

The program characteristics are preferably designed, for optimal use of the present invention, as invariant information for application components. The combination policy rules are preferably determined by the capabilities of the target operating environment. Thus, the program characteristic values may remain unchanged, even in light of changes to the capabilities of the operating environment: changes to the environment are reflected by changes to the column vector V(E) and by changes to the combination policy matrix, as necessary, after which the distribution of components may be recomputed. The program characteristics for a particular component may be reused from one operating environment to another.

The edgeability determination technique of the present invention may operate within a network configuration such as the sample network shown in FIG. 1, which has been previously described, to determine whether application components being deployed may be offloaded to an edge server (represented generally by edge servers 120). FIG. 2 shows an abstract representation of information used for operation of the present invention, illustrating at a high level how an embodiment of the invention determines which components may be deployed at the edge of a network (such as server site 100 of FIG. 1). This process will now be described.

As shown in FIG. 2, the present invention uses program characteristic vocabulary information 205 and environment characteristic vocabulary information 210 as input, and factors values specified for these vocabularies in with a combination policy 215 to implement an edge execution scheme 220 which determines which components should be (or may beneficially be) executed at the network edge. FIGS. 3A and 3B illustrate use of several example program characteristics, and FIGS. 4A and 4B illustrate use of several operating environment characteristics. The combination policy is illustrated in FIGS. 5, 7A, and 7B. FIG. 6 shows how a representative edgification determination is made, using the sample values from FIGS. 3, 4, and 5.

Turning now to FIG. 3A, example program characteristics are shown, along with representative weighting values, that might be specified to describe a program component implemented as a servlet which accesses stored information about a corporation's employees. The first program characteristic (see element 301) pertains to whether the application component makes frequent database modifications using JDBC™. For the servlet of this example, this feature does not apply to the servlet, and thus a value of 0 has been specified by the programmer (see element 302). The next program characteristic 303 pertains to whether the application component makes frequent directory modifications using JNDI. ("JDBC" refers to a set of classes for accessing relational databases, and "JNDI" is an acronym for "Java Naming and Directory Interface™". "JDBC" and "Java Naming and Directory Interface" are trademarks of Sun Microsystems, Inc. Their functionality is well known to those of skill in the art, and a description thereof is not deemed necessary to an understanding of the present invention.) In the servlet example, this JNDI program characteristic is not applicable, and has a value of 0 (see 304). The other example program characteristics include:

whether the component has read-only access to databases with JDBC (see 305);

whether the component has read-only access to directories with JNDI (see 307);

whether the component has no data access (see 309);

whether the component makes only local writes (see 311);

whether the component uses EJBs (see 313);

whether distribution of this component must be restricted due to presence of trade secrets in the component, such as algorithms which are contained therein (see 315);

whether the component accesses sensitive data, such as private keys used in cryptographic functions, and therefore needs a secure operating environment (see 317); and whether distribution of this component must be restricted due to legal requirements such as export regulations or licensing restrictions (see 319).

FIG. 3B depicts the row vector corresponding to the values which have been specified for the program characteristics in the servlet example. As can be seen by inspection, the 10 characteristics represented in FIG. 3A each have a corresponding numeric value in the row vector.

FIG. 4A shows sample operating environment characteristics, along with representative weighting values, that might be specified to describe the environment in which the servlet of the example is to be deployed. The first operating environment characteristic (see element 401) pertains to whether the operating environment provides EJB support at the network edge. For the sample environment, this is false and thus a value of 0 has been specified for this feature (see element 402). The next operating environment characteristic 403 pertains to the average relative link speed between the edges and the back-end resources, and a value of 0.8 has been specified for this feature (see element 404). The other example operating environment characteristics include:

whether the servers at the network edge meet particular security requirements; in preferred embodiments, details of these security requirements are known to the programmer and to the administrator as they provide their input (see 405); and whether the servers at the network edge are licensed for executing all code which contains particular legal restrictions of the type discussed with reference to element 319 of FIG. 3A (see 407).

FIG. 4B depicts the column vector corresponding to the values which have been specified for the operating environment characteristics in the example. As can be seen by inspection, the 4 characteristics represented in FIG. 4A each have a corresponding numeric value in the column vector.

It will be obvious to one of ordinary skill in the art that the characteristics described with reference to the examples of FIGS. 3A and 4A are merely for purposes of illustration. Additional, fewer, and/or different characteristics might be used in a particular implementation of the present invention. For example, it might be useful to include an operating environment characteristic that specifies whether there is a capacity constraint on the functions that can be placed at an edge server, and it might be useful in some implementations to provide separate program characteristics for licensing considerations and for other types of legal restrictions.

FIG. 5 shows a sample combination policy matrix M(PE) that may be created to represent the dependencies between the 10 program characteristics illustrated in FIG. 3A and the 4 operating environment characteristics illustrated in FIG. 4A. Each value in the cells of the matrix may be considered as a weight which will influence the edgeability decision. For example, the entry in cell (1, 2) is 1 (see element 503). The program characteristic reflected in this first row 501 is "Frequent database modifications using JDBC", and the operating environment characteristic reflected in this second column 502 is "Average relative link speed between edges and backend". A value of "1" indicates that these features are highly dependent on one another; furthermore, by providing a value of 1, this combination favors edgeability in the matrix multiplication. (That is, the product that is added to the computed EW sum will be maximized, when the policy value is 1.) As another example, the entry in cell (8,3) is also 1 (see element 506), and therefore indicates that a program characteristic of "trade secret" 504 is highly dependent on an operating environment characteristic of "edge meets security requirements" 505.

In general terms, a combination policy matrix reflects whether particular combinations of features indicate that a component is edgeable or not edgeable. For example, if a component uses JDBC access to shared data, then it should be considered not edgeable, and if a component accesses data in primarily a read-only mode, then it favors edgeability. Combining program characteristics of a particular component with the combination policy indicates whether this particular component is edgeable, and factoring in the operating environment characteristics of the current environment (through its column vector) then determines whether or not the component will actually be deployed at the edge.

Referring now to FIG. 6, an edgification determination using the sample row vector V(P) from FIG. 3B, the sample combination policy matrix M(PE) from FIG. 5, and the sample column vector V(E) from FIG. 4B uses matrix multiplication to compute an edgification weight EW. Using the sample values which are provided in the figures of this example, the edgification weight is 0.72. Assuming that the threshold T has been set at something less than 0.72, then this component would be considered edgeable.

Optionally, multiple predefined matrices may be provided for particular edge servers, where each matrix captures a different set of guidelines. (These matrices might be provided, for example, by companies providing system integration services, and/or might be provided along with an implementation of the present invention.) A particular one of the matrices can then be selected at deployment time, for use in determining how application components should be off-loaded using the guidelines reflected by that matrix. (In an optional enhancement, more than one matrix may be used successively for determining edgeability of a program component.) FIGS. 7A and 7B illustrate different matrices that may be provided for edge servers operating in different roles. FIG. 7A shows a sample combination policy matrix 700 for use with an edge server operating as a surrogate (i.e. reverse proxy). When combined with the row vector of FIG. 3B and the column vector of FIG. 4B, this matrix yields an edgification weight of 0.8. This matrix might be used, for example, when an edge server is co-located with an origin server, in which case the edge server presumably has the same network security and careful administration as the origin server. In such a setting, the fact that a program characteristic indicates that a particular program component includes a trade secret that makes it a sensitive component should not matter to the edgeability decision; hence, all entries in the matrix for the trade secret row 710 are set to 0 to indicate an absence of dependency (i.e. that the trade secret program characteristic does not have an important interaction with any of the environment characteristics). Similarly, the security row 720 is set to all zeroes to indicate that security considerations of program components do not have a material impact on the edgeability decision for this edge server.

On the other hand, the example matrix 750 in FIG. 7B may be used to describe the policy for an edge server which is geographically distributed out into the network, possibly outside the administrative control of the origin site, and thus very likely has a less secure environment than the edge server represented by matrix 700. Therefore, there is a need to be concerned about security issues such as loss of trade secrets, and also about issues of performance. Furthermore, certain extra support is required at the edge server for particular types of program components when the edge server is remotely located. To reflect the changes in security issues, as compared to the matrix in FIG. 7A, non-zero entries are provided in the column 760 which represents "edge server meets security requirements" for the trade secret and security rows 770, 780 (as well as for several other rows). These non-zero values indicate that the "meets security requirements" operating environment characteristic strongly affects (to a degree of 1.0, in each case) the edgeability for program components which contain trade secrets or have legal restrictions on distribution, respectively.

In an optional modification of the present invention, the matrix manipulation can be generalized to other kinds of operations beyond the standard multiplication and accumulations of the products thereof when deciding edgification, and a capability may be introduced for allowing one or more selected program characteristics (and/or operating environment characteristics) to completely block the edgeability of a component. In this modification, the values to be specified in the row vectors and column vectors take on one of three values: −1, 0, or 1, where providing a value of −1 is designed to block edgeability. A −1 value in the program characteristics vector signifies "has this characteristic and the characteristic must be supported for edgeability"; a 0 value means "does not have this characteristic", and a 1 value means "has this characteristic". A −1 value in the operating environment characteristics vector signifies "not supported and blocks edgeability if any program characteristic needs this"; a 0 value means "not supported"; and a 1 value means "supported". Entries in the combination policy matrix take on one of two values: 0 or 1. A 0 value in the combination policy matrix means "not related" whereas a 1 value means "related".

Using this optional modification in an example, suppose the environment characteristic "EJB support at edge" has the value −1 (to block edgeability if a program component needs EJB support at the edge). Then, if the program characteristic entry in the row vector for any application component has a non-zero value and this entry is linked (by a non-zero entry in the combination policy matrix) to this environment characteristic, then the edgeability for this component should be blocked (that is, the component should be considered non-edgeable). The matrix multiplication that occurs when using this modification multiplies V(P) and M(PE) as before. Then, the result is multiplied with V(E) with the following caveats: (1) if any of the numbers that are being multiplied are −1 and a non-zero number, then the result is −1; (2) when adding products from the multiplication, if any of the products is −1, then the result is −1; and (3) at the final decision as to edgeability, if a −1 value is obtained, then the component is non-edgeable. (As an alternative, this third caveat may use a threshold value, whereby if the final total is less than this threshold, then the component is non-edgeable.)

Thus, it has been shown how the techniques of the present invention provide a flexible approach for dynamic application component deployment decisions which overcomes the drawbacks of prior art approaches. Multiple parties are involved in providing input for edgeability decisions, each party providing input in their own area of expertise. Modification by a programmer or administrator (i.e. in the program and its characteristics, or in the environment and its characteristics, respectively) no longer requires consultation with other parties in order to make edgeability decisions. Thus, less coordination effort is required, reducing complexity and cost of deployment while increasing accuracy. The disclosed technique is user extendable, allowing additions or changes to the program characteristics, operating environment characteristics, and/or combination policy matrix in use. (It should be noted that while J2EE applications and environments using edge servers have been used for describing operation of the present invention, this is merely illustrative: the present invention is not limited to use with such applications and environments, nor to the particular characteristics which have been used in the illustrations.)

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While the preferred embodiments of the present invention have been described, additional variations and modifications in those embodiments may occur to those skilled in the art once they learn of the basic inventive concepts. As one example, while preferred embodiments are described as using matrices and vectors, alternative embodiments may specify information in other forms. Therefore, it is intended that the appended claims shall be construed to include the preferred embodiments and all such variations and modifications as fall within the spirit and scope of the invention.

What is claimed is:

1. A method of programmatically determining whether application program components are suited for deployment at an edge of a computing network, comprising steps of:

retrieving a P-element vector V(P) containing a numeric value for each of P characteristics of a particular executable application program component to be potentially deployed at the edge, where P>1, each of the characteristics pertaining to executable code of the application program component and each of the numeric characteristic values specifying whether this characteristic is important for this application program component;

retrieving an E-element vector V(E) containing a numeric value for each of E characteristics of an operating environment in which the deployment at the edge is to potentially occur, where E>1, each of the characteristics pertaining to execution of code in the operating environment and each of the numeric characteristic values specifying whether this characteristic is applicable for the operating environment;

retrieving a P×E-dimension policy matrix M(PE) containing numeric values which express how dependent each of the characteristics of the application program components is on each of the characteristics of the operating environment; and using matrix multiplication to programmatically combine the vector V(P), the vector V(E), and the policy matrix M(PE) to yield a result which determines whether the particular application program component is suited for deployment at the edge of the computing network.

2. The method according to claim 1, further comprising the step of comparing the result to a threshold to determine whether the particular application program component is suited for deployment at the edge.

3. The method according to claim 1, wherein the characteristics of the one or more application program components and the vector of numeric values therefor are supplied by developers of the components.

4. The method according to claim 1, wherein the characteristics of the operating environment and the vector of numeric values therefor are supplied by an administrator of the environment.

5. The method according to claim 1, wherein the policy matrix and the numeric values contained therein are supplied by a deployer.

6. The method according to claim 1, wherein the values in the P-element vector, the values in the policy matrix, and the values in the E-element vector range between zero and one.

7. The method according to claim 1, wherein the step of using matrix multiplication further comprises changing the matrix multiplication upon encountering particular predetermined itermediate results to substitute a particular number in place of a number generated if performing the matrix multiplication.

8. A system for programmatically determining whether application program components are suited for deployment at an edge of a computing network, comprising:

means for retrieving a P-element vector V(P) containing numeric value for each of P characteristics of a particular executable application program component to be potentially deployed at the edge, where P>1, each of the characteristics pertaining to executable code of the application program component and each of the numeric characteristic values specifying whether this characteristic is important for this application program component;

means for retrieving an E-element vector V(E) containing a numeric value for each of E characteristics of an operating environment in which the deployment at the edge is to potentially occur, where E>1, each of the characteristics pertaining to execution of code in the operating environment and each of the numeric characteristic values specifying whether this characteristic is applicable for the operating environment;

means for retrieving a P×B-dimension policy matrix M(PE) containing numeric values which express how dependent each of the characteristics of the application program components is on each of the characteristics of the operating environment;

means for using matrix multiplication to programmatically combine the vector V(P), the vector V(E), and the policy matrix M(PE) to yield a result; and means for comparing the result to a threshold to determine whether the particular application program component is suited for deployment at the edge of the computing network.

9. A computer program product for programmatically determining whether application program components are suited for deployment at an edge of a computing network, the computer program product embodied on one or more computer-readable media and comprising:

computer-readable program code for retrieving a P-element vector V(P) containing a numeric value for each of P characteristics of a particular executable application program component to be potentially deployed at the edge, where P>1, each of the characteristics pertaining to executable code of the application program component and each of the numeric characteristic values specifying whether this characteristic is important for this application program component;

computer-readable program code for retrieving an E-element vector) V(E) containing a numeric value for each of E characteristics of an operating environment in which the deployment at the edge is to potentially occur, where E>1, each of the characteristics pertaining to execution of code in the operating environment and each of the numeric characteristic values specifying whether this characteristic is applicable for the operating environment;

computer-readable program code for retrieving a P×E-dimension policy matrix M(PE) containing numeric values which express how dependent each of the characteristics of the application program components is on each of the characteristics of the operating environment;

computer-readable program code for using matrix multiplication to programmatically combine the vector V(P), the vector V(E), and the policy matrix M(PE) to yield a result; and computer-readable program code for comparing the result to a threshold to determine whether the particular application program component is suited for deployment at the edge of the computing network.

10. The method according to claim 1, wherein the numeric values in the policy matrix provide weighting factors for yielding the result.

11. The method according to claim 1, wherein one of the characteristics of the particular application program component is whether the particular application program component needs a secure operating environment and one of the characteristics of the operating environment is whether the operating environment is secure.

* * * * *

UNITED STATES PATENT AND TRADEMARK OFFICE
CERTIFICATE OF CORRECTION

| | |
|---|---|
| PATENT NO. | : 7,089,299 B2 |
| APPLICATION NO. | : 10/047831 |
| DATED | : August 8, 2006 |
| INVENTOR(S) | : Chetuparambil et al. |

It is certified that error appears in the above-identified patent and that said Letters Patent is hereby corrected as shown below:

Column 3,
Line 64, change "illustrates of" to -- illustrates use of --.

Signed and Sealed this

Seventh Day of November, 2006

JON W. DUDAS
*Director of the United States Patent and Trademark Office*